(12) United States Patent
Mauffrey

(10) Patent No.: US 6,799,505 B2
(45) Date of Patent: Oct. 5, 2004

(54) TOASTER WITH REINFORCED WALLS

(75) Inventor: Guy Mauffrey, Breuchotte (FR)

(73) Assignee: SEB S.A., Ecully (FR)

( * ) Notice: Subject to any disclaimer, the term of this patent is extended or adjusted under 35 U.S.C. 154(b) by 151 days.

(21) Appl. No.: 10/311,878

(22) PCT Filed: Jun. 18, 2001

(86) PCT No.: PCT/FR01/01900

§ 371 (c)(1),
(2), (4) Date: Dec. 20, 2002

(87) PCT Pub. No.: WO03/007607

PCT Pub. Date: Jan. 23, 2003

(65) Prior Publication Data

US 2003/0145739 A1 Aug. 7, 2003

(30) Foreign Application Priority Data

Jun. 20, 2000 (FR) .............................. 00 07877

(51) Int. Cl.[7] .............................................. A47J 37/08
(52) U.S. Cl. .............................. 99/385; 99/389; 99/391
(58) Field of Search .................... 99/326–333, 385–393, 99/348, 467–470, 492, 494, 497, 486, 521–524

(56) References Cited

U.S. PATENT DOCUMENTS

| 1,596,081 A | | 8/1926 | Coleman |
| 3,157,108 A | | 11/1964 | McKenney et al. |
| 4,718,332 A | | 1/1988 | Mothrath |
| 4,972,768 A | * | 11/1990 | Basora San Juan ........... 99/391 |
| 5,181,455 A | * | 1/1993 | Masel et al. .................. 99/391 |

FOREIGN PATENT DOCUMENTS

| FR | 2 703 576 | 10/1994 |
| FR | 2 759 276 | 8/1998 |

* cited by examiner

Primary Examiner—Timothy F. Simone
(74) Attorney, Agent, or Firm—Browdy and Neimark, P.L.L.C.

(57) ABSTRACT

The toaster shell (2) is open at the top, and is reinforced by a ring (30) which is mechanically attached to the top edge of the walls (2a) forming the toaster shell. The ring has a 'U'-shaped cross-section which fits over the edges of the walls. The ring is made of a material with low thermal conductivity, ideally molded from a heat-resistant plastic.

14 Claims, 6 Drawing Sheets

TOASTER WITH REINFORCED WALLS

Figure 1:
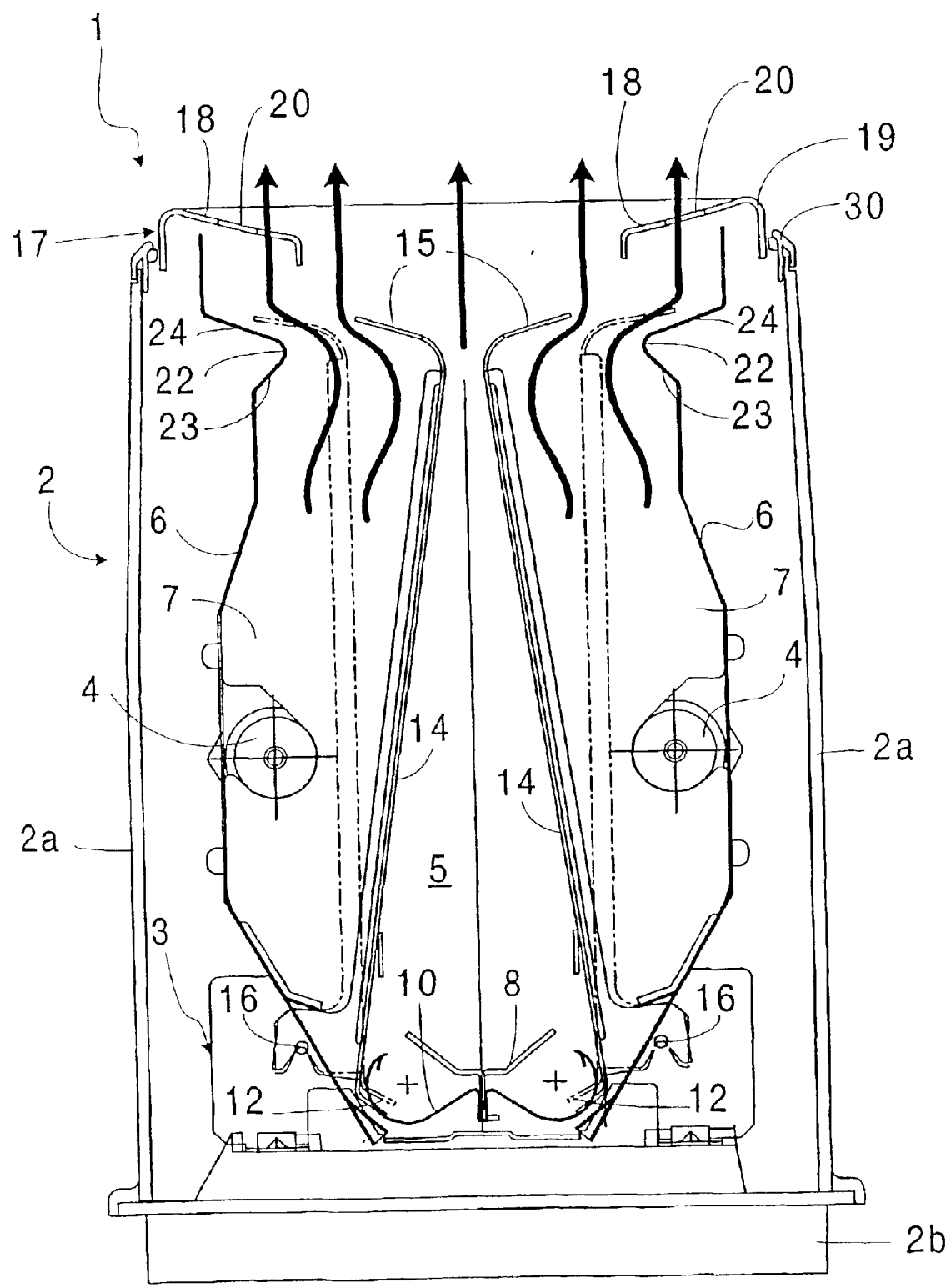

The present invention relates to the technical field of household electrical cooking appliances of the toaster type and concerns more particularly a means for permitting the walls of the housing of the toaster to be made rigid.

Most present day toasters have one or several chambers for heating bread, housed, with mechanisms for displacing the bread support carriage and the control electronics, at the interior of a plastic housing. The heating chambers often have a roof made of metal or of a material having a certain thermal inertia.

In order to reduce the costs of the plastics utilized for the housing, this latter is often spaced from the heating elements that are brought to a high temperature, such as the roof of the toaster. However, the natural elasticity of the plastic induces, when the toaster is gripped by the lateral walls, a certain risk of contact between said walls of the housing and the roof, or even the heating chamber, which can lead to, if the toaster is in operation, or has just halted operation, a risk of local melting of the housing.

In order to overcome this problem, numerous manufactures propose an upper edge of the housing of the toaster, which permits the walls to be sufficiently rigidified to avoid all contact with the roof. This edge is generally situated above the roof. Insulating crosspieces connecting the hot surfaces of the roof to the walls can complete the stiffening of the walls of the housing.

One of the consequences of the presence of this edge is the surface of the roof limited by said edges and thus a significant lateral obstruction of the toaster with respect to the useful surface of the roof.

Moreover, the presence of this upper edge requires that the fabrication of the housing necessarily be in two steps, the edge not permitting molding of the bottom of the housing with the vertical walls.

One of the objects of the present invention is to overcome the problems of the prior art by providing a toaster whose housing is rigidified in order to avoid all contact with the roof, without significantly increasing the thermal transfer from the roof toward the housing.

Another goal of the present invention is to reduce the quantity material necessary for fabrication of the housing.

Another object of the present invention is to permit the fabrication of a toaster housing having four lateral walls and a base plate in a single molding step.

The present invention is achieved with the aid of a means for stiffening a toaster housing, said housing being open at its upper part and being defined by one or several vertical walls resting on a base plate, characterized in that it consists of a ring or ring portion capable of being mechanically linked with the upper parts of the walls of the housing.

Advantageously, the form of the ring or portion of a ring, as seen in a plan view, corresponds substantially to the form or a part of the form of the peripheral edge of a housing on which it is arranged. Notably, according to the toaster model, this ring can have a rectangular form, or an oval form, or any other compound form.

This ring or ring portion which is peripheral along the circumference of the housing, situated at the top of said housing, permits deformation of the walls of the housing to be limited when these walls are urged in flexure, particularly when the user grasps the toaster by said walls. By limiting their deformation, the risk of contact between these walls and the parts of the heating chamber which can present an elevated temperature, is reduced. Thus, the walls of the housing of the toaster can be made thinner, reducing the quantity of material and thus the costs.

In a particularly advantageous manner, the stiffening ring or ring portion is made of a material having low thermal conductivity. This property permits said ring or ring portion to be given, in addition to its function of rigidifying the walls of the housing, a function of thermal insulation of the walls of the housing relative to the parts of the toaster that experience an increased temperature, such as the roof of the toaster.

According to a particular form of construction of the invention, the ring or ring portion is made of a heat resistant plastic, permitting attainment of the two desired properties of stiffening and thermal insulation, while offering a material that has a low cost and is easy to use. According to one of the embodiments of the invention, the stiffening ring or ring portion has a transverse cross section at least partially U-shaped such that the upper edge of the housing can fit into said ring or ring portion. This partial overlapping of the two elements permits, when a compression force is exerted on the toaster walls, the force to be transferred to the ring or ring portion.

As a complement or a variant of the preceding embodiment, the ring or ring portion has means for attachment to the walls of the housing of the toaster, permitting a mechanical connection to be assured with the walls of the housing.

The present invention equally relates to a toaster having a frame arranged in a housing, at least one vertical toasting chamber open at the upper part of the housing, a peripheral roof at the opening of the toasting chamber, located essentially in the spaced defined by the housing and having an upper edge provided with openings, heating means situated in proximity to the toasting chamber, characterized in that the toaster has a means for stiffening the walls of the housing as described previously.

Such a roof can be designed in a form and of a material permitting reheating to be effectuated on food products placed directly on said roof.

According to one of the embodiments, the stiffening ring or ring portion has a support zone for the roof of the toaster. By permitting connection of the roof to the walls of the toaster by the intermediary of the rigidifying means, the annular space generally present between the roof and the housing is eliminated, which permits, in addition to rigidifying the walls of the toaster, to exploit the reheating function of the roof, while reducing the risks of introduction of crumbs or objects into the interior or the toaster.

According to another embodiment, the ring or ring portion has one or several ribs, having a function of centering the roof. The rib or ribs are such that they leave only a functional play with the roof, in a manner such that the centering of the roof is automatically effectuated by the ring or ring portion when these two elements are disposed on the toaster.

Moreover this centering of the roof by the ribs permits a defined spacing of the walls of the housing of the toaster from said roof to be assured, the layer of air thus defined reinforcing the thermal insulation of the ring when this latter is made of a thermal insulating material. The value of the air layer can be adjusted by the form given to the ring.

According to a variant of this embodiment, certain of these ribs achieve a centering of the roof at the exterior thereof, while others achieve a centering at the interior of the roof. The ribs are then situated, either in a facing relation on a substantially horizontal internal edge of the ring or ring portion, in such a manner as to provide a space for receiving the roof between them, or offset in alternation for an internal guiding/external guiding of the roof.

As a complement of these variants of construction, the toasting chamber is delimited by two substantially vertical gripping grids capable of moving toward one another when the heating elements are supplied with power, said gripping grids having an upper edge that is substantially perpendicular to said grids and oriented toward the exterior of the chamber, in a manner to partially close the heating chamber, when they have moved towards one another, to thus divert the ascending hot air flow generated by the heating elements.

This configuration permits the heat flow generated by the heat elements to be distributed as desired so that it will not be concentrated solely toward the central part of the chamber, the edge thus arranged acting as a deflector in order to deflect the hot air flow. The ascending heat flow, partially deflected, is thus distributed, which aids a uniform reheating of bread placed on the sheet.

Advantageously, reflectors are associated with the heating elements, said reflectors having, toward their upper end, a narrowing by the intermediary of two converging slopes.

This narrowing is favorable for a good conservation of heat in the toaster in the toasting mode, while permitting an orientation of the heat flux laterally, for a uniform reheating of bread placed on the edge of the roof.

The present invention equally relates to a toaster having a frame arranged in a housing that is open at its upper part in being defined by one or several vertical walls resting on a base plate, at least one vertical toasting chamber open at the upper part of the housing, a roof peripheral to the opening of the toasting chamber, heating means situated in proximity to the toasting chamber, said housing being made of a plastic material, characterized in that the walls of the housing do not have an edge at the upper part and are molded with the base plate of the housing.

The possibility of molding the housing with the base plate generates a saving of time and permits a reduction of cost.

As a complement to the preceding form of construction, the toaster has a means for stiffening the walls of the housing as previously described.

The mechanical reinforcement of the walls of the housing such as proposed permits elimination of the upper edge as conventionally encountered and which requires a molding of the housing without the base plate. Since the edges are no longer necessary to rigidify the housing, due to the means presented, it is then possible to mold the housing with its base plate in a single piece, without adversely affecting the final rigidity of the product.

Figure 2:
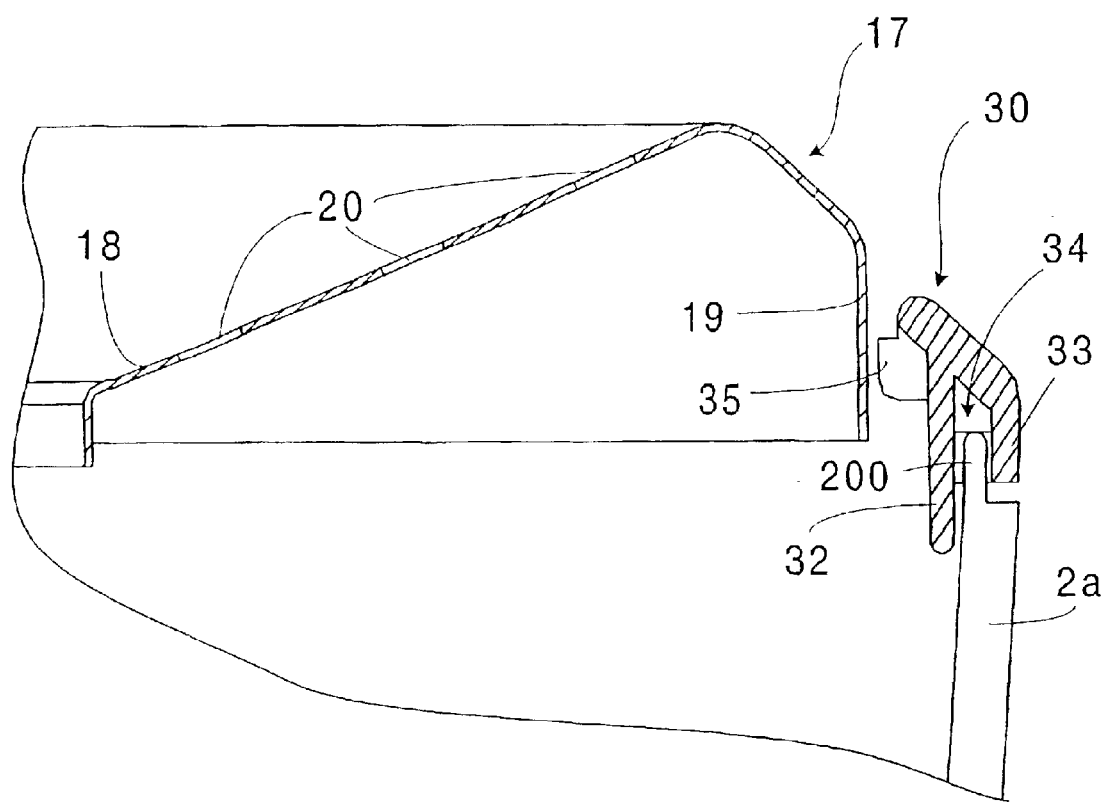
Figure 3:
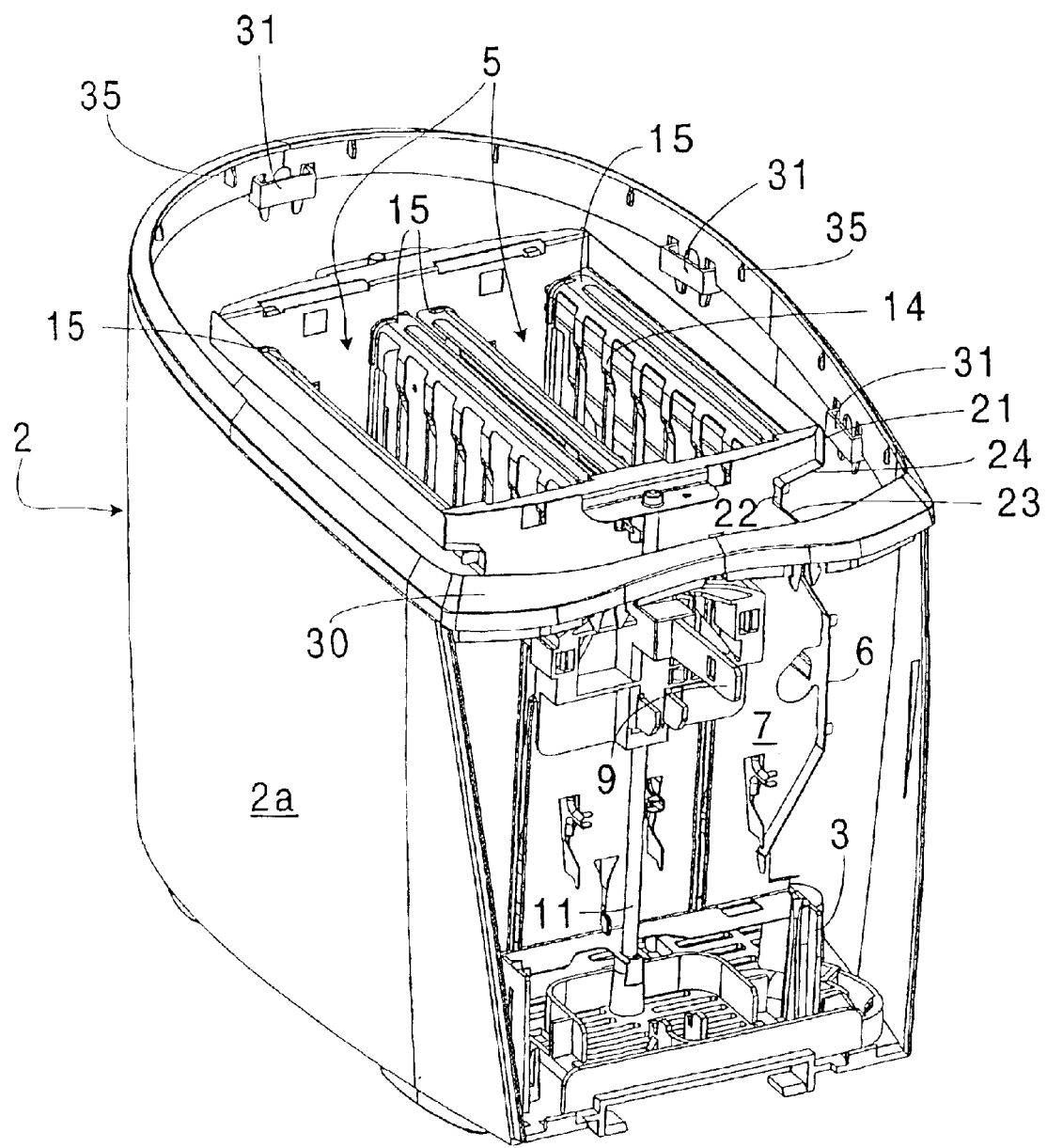
Figure 4:
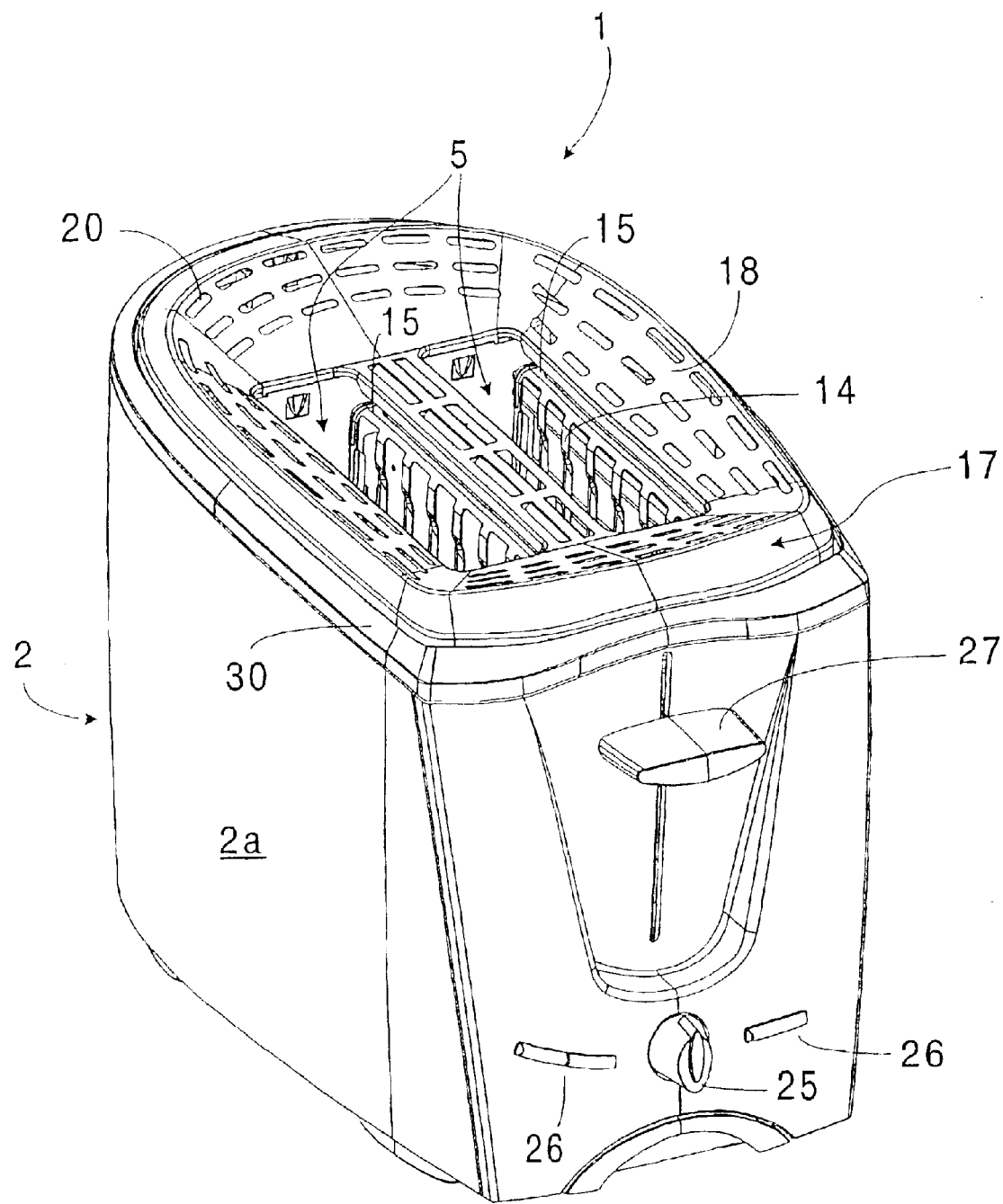
Figure 5:
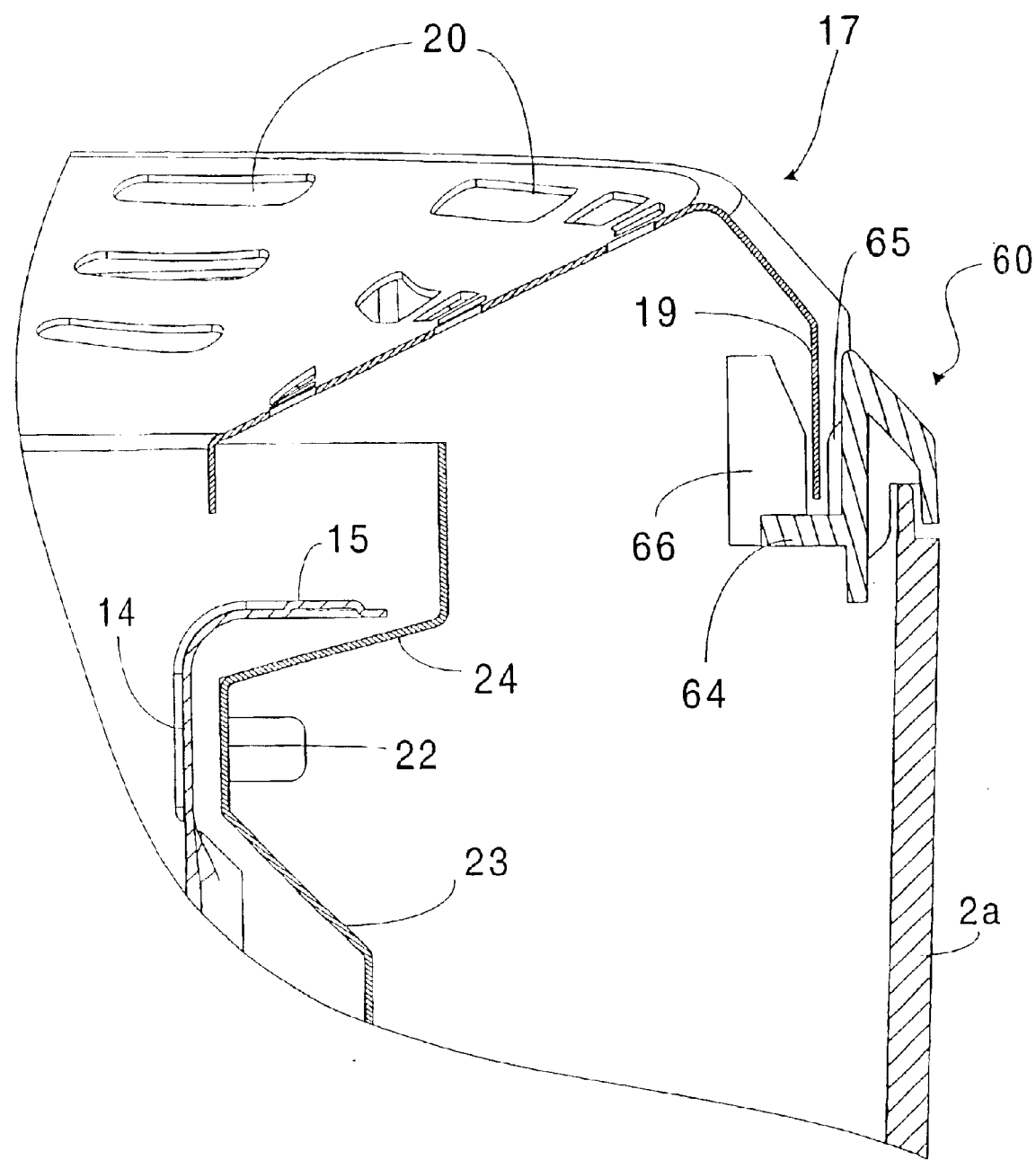
Figure 6:
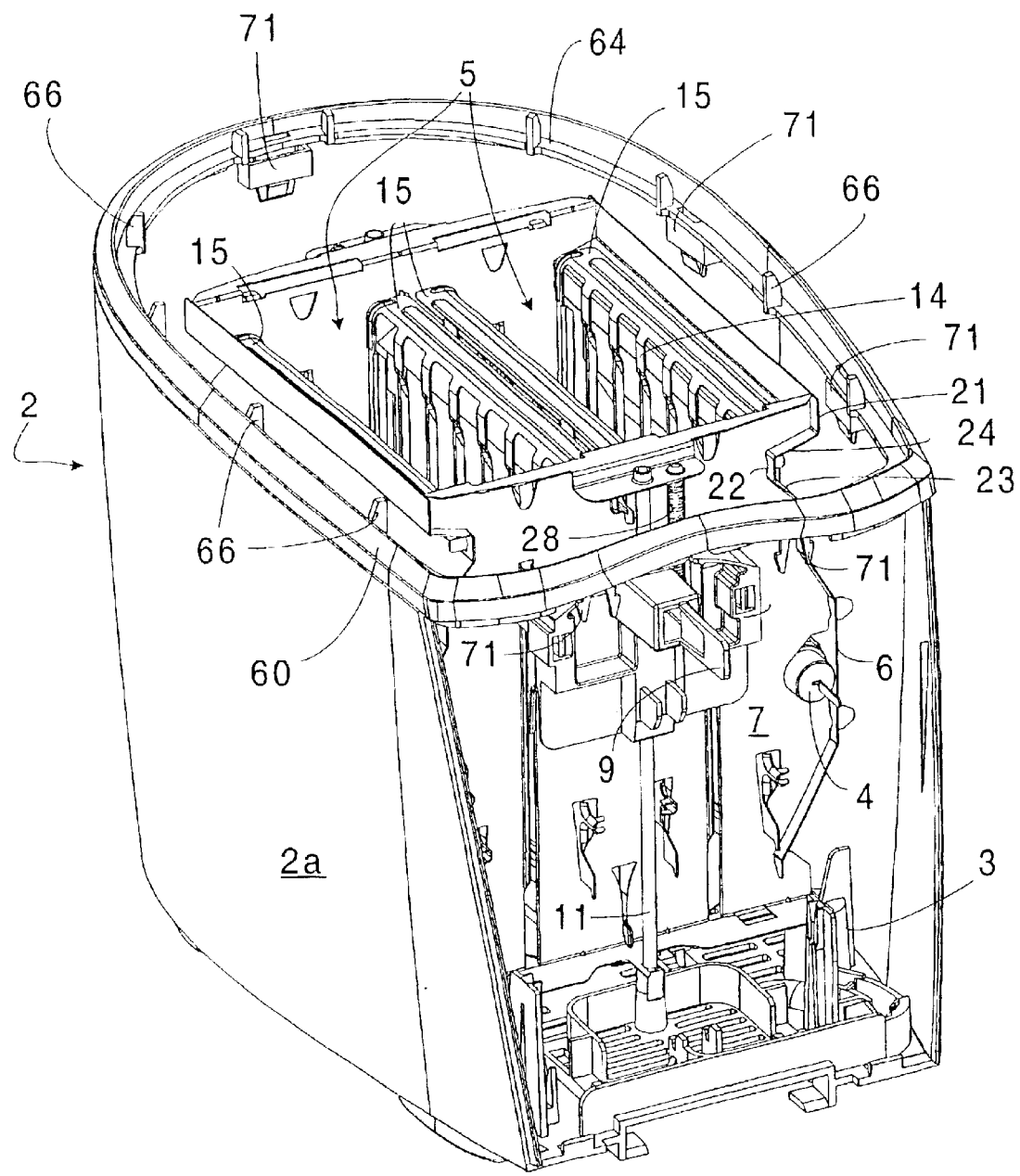

The present invention will be better understood with the aid of the description that will follow, with reference to the attached Figures, given by way of non-limiting example, among which colon FIG. 1 is a transverse cross-sectional view of a toaster according to the invention, FIG. 2 is an enlarged view of the stiffening means, FIG. 3 is a perspective view of a toaster equipped with the present invention, the representation of the roof and of the front part of the toaster having been omitted to improve reading of said figure, FIG. 4 is a perspective view of a toaster equipped with the present invention, as well as of the roof and of the front part not shown in FIG. 3, FIG. 5 presents an enlarged view of a variant of construction of the stiffening means, FIG. 6 is a perspective view of a toaster equipped with a variant of construction of the invention presented in FIG. 5.

As is clearly visible in FIG. 1, toaster 1 according to the present invention has a housing 2 having an upper opening and at the interior of which is arranged a frame 3 composed particularly of two longitudinal reflectors 6 as well as two transverse walls 7 provided with notches in which are positioned heating elements 4. Two grids 14 define a heating chamber 5.

According to the invention, the housing is a plastic housing made of a standard inexpensive material such as polypropylene, commonly designated by the abbreviation PP. The housing is delimited by vertical wall 2a, a base plate 2b and is opened in its upper part. In this space is disposed a roof in the form of a sheet 17 having an edge 18 and a vertical wall or flange 19.

This roof serves principally as a cover for heating chambers 5, preventing particularly access to elements to which a voltage is applied, while reducing the introduction of bread crumbs or various objects into the toaster, outside of the heating chambers. For this sole purpose, the roof is preferably situated at the interior of the housing.

According to the example presented, the roof equally permits reheating of rolls or similar food products. To this end, the roof is elevated with respect to the housing of the toaster.

By way of a variant, the roof can be made with the aid of other materials having thermomechanical characteristics compatible with the temperatures developed at the outlet of the heating chambers during the cooking of bread. Materials such as technical plastics, ceramics, glasses, . . . can thus be utilized.

Edge 18 is oriented toward the opening of the heating chamber, in a manner that is peripheral thereto. This edge 18 has openings 20, clearly visible in FIG. 4, and of which the form, the dimensions and the distribution can vary according to the arrangement of the heating elements, the heating power, . . . .

There are equally visible, FIG. 4, the button 25 for controlling the desired degree of toasting, as well as various controls 26 for specific functions, stopping force, defrosting function, bagel function (one single side of heating), . . . .

Advantageously, edge 18 of this sheet is not flat and can have bosses situated between the openings and/or an incline along the width of the edge. Other configurations can be envisioned without departing from the framework of the present invention, the principle being to present bread support zones that are raised with respect to the housing 2 and, advantageously, with respect to openings 20.

Two gripping grids 14, defining the heating chamber, are pivoted around a point 16 and have a curved part 12 at their end situated in the lower part of the toaster, this curved part 12 being oriented toward the interior of the chamber. In this zone us equally found a spring blade 10 capable of being displaced by a bread supporting carriage 8 when this latter is brought into the low position of the toaster by the piece 9 projecting from the housing and actuated by the button 27.

The gripping grids 14, at their opposite end, i.e., at the top of the heating chamber, are curved in a manner to present an edge 15 substantially perpendicular to the plane defined by the grids, this edge being oriented toward the outside of the chamber.

In FIG. 1, is indicated, in dotted lines, the position of grids 14 when the carriage is in its loading/unloading position, while the representation in solid lines corresponds to the position of the grids when the toaster is in operation, i.e. when the heating elements are supplied with power.

Furthermore, reflectors 6 have a narrowing 22, having, at one side and the other, two slopes oriented toward the outside of the chamber, the first slope 23, at the side of the heating elements, permitting the heat to be turned toward the center of the toaster, while the second, 24, situated above the narrowing, orienting the heat toward the lateral parts of the toaster.

The function of such a toaster is detailed in the application FR 99 12257. The particular form of the grids and of the reflectors permits braking of the convection by removing the heat at the lateral sides of the toaster and by limiting the central heat flow, as indicated by thick arrows in FIG. 1.

More particularly according to the invention, a ring 30 is disposed on the housing, in resting on the free ends of walls 2a of the housing of the toaster. This peripheral ring is preferably made of a rigid or semi-rigid material permitting all significant movement of the walls toward the interior of the toaster to be prevented.

The cross section of FIG. 2 presents in greater detail the transverse cross section of the ring and its positioning on the housing of the toaster, according to a non-limiting example of the construction of the invention.

Thus, the profile of ring 30 presents a groove 34 delimited by two edges 32 and 33 giving, to this transverse cross section, a general form of an inverted U.

This groove permits the ring to be adapted to wall 2a of the housing or, as shown, on a thinned part 200 of said wall 2a.

Groove 34 of the ring, such as shown, is substantially identical along its entire periphery. According to the example presented, the ring is fitted on the housing and maintained thereon by clips 31 distributed around its circumference.

According the example presented, the ring serves as a cross piece between roof 7 and housing 2, to assure the rigidity of the assembly, while thermally insulating the housing from the roof. For this purpose, ring 30 presents either a continuous rib on its periphery, or, as shown, several interior ribs 35, located at certain points of the ring.

There thus exists, according to this configuration, a reduced play in the play necessary for assembly, between roof and ribs 35, this play preferably being about 0.5 mm. According to the example presented, the centering ribs are spaced about 50 mm from one another. This configuration permits internal wall 32 of the ring to the spaced from vertical wall 19 of roof 17 by a space approximately equal to 1.5 mm in order limit heat transfer toward said ring, while permitting the dimensional tolerances associated with the tooling.

The ring is preferably made of a heat resistant plastic. By heat resistant plastic, there is intended a plastic material having thermomechanical properties adapted to the type of cooking performed in the appliance. These materials can be for example of the polyamide (PA), polypropylene-styrene (PPS) melamine or polybutadiene-terephtlate (PBT) type which presents a good performance/price ratio.

In order to thermally protect the upper part of wall 2a of the housing, interior edge 32 of ring 30 covers wall 2a of the housing over a certain length, limiting heat transfer by radiation originating from the roof.

The utilization of a ring such as presented thus permits, in addition to rigidifying the wall, thermally insulating the walls of the housing from the elements that are brought to a high temperature.

One understands then the value of the present invention by the possibility offered of a wide roof, at least as wide as the width of the housing of the toaster, and which permits, when the roof is utilized for a reheating function, to present a substantial surface, without increasing the size of the toaster.

As a variant of the constructions of the invention, in order to reduce the cost of production, the means permitting the walls to be rigidified are constituted by portions of the ring along the circumference of the housing, located on the housing as previously explained or on the internal wall of the housing.

Maintenance of the roof on a toaster can be achieved in different ways.

According to a first embodiment, relative to the example set forth, the rigid roof is fixed on the top of the frame by any known means and can serve to rigidify the walls of the housing by the intermediary of the cross piece ring, since this latter leads to an automatic centering of the housing with respect to said roof.

The inverse situation, where the roof is mounted in a floating manner on the frame of the toaster, in such a manner that the position of the ring leads to an automatic centering if said roof, also enters into the framework of the present invention.

According to another embodiment of the invention, the ring or ring portion, has, in addition to centering ribs, a roof supporting zone permitting maintenance of this latter. This supporting zone can be located in a manner such that the roof, the ring and the walls of the toaster have a continuity of form, improving the esthetic appearance of the product while limiting the introduction of crumbs into the interior of the toaster. This configuration equally permits presentation of a substantial roof surface without increasing the dimensions of the housing.

FIGS. 5 and 6 present respectively such a variant of construction of the means for stiffing as well as a toaster equipped with said means.

According to this variant of construction, the stiffening means are constituted by a ring 60 having, in addition to the U-shaped cross section as previously described, two important particularities:

a horizontal rim 64 at the lower part, directed toward the interior and on which outer flange 19 of roof 17 can rest. This rim equally increases the stiffening power of the ring.

ribs 66 resting on rim 64. These ribs and ribs 65 form a peripheral space in which outer flange 19 of the roof 17 comes to be lodged.

The centering of the roof is thus achieved by a guiding of the flange toward the outside and toward the inside. By reducing the peripheral space between ribs 65 and 66, there is thus achieved an internal and external retention of the flange of the roof.

In addition, in this variant of construction of the ring, the totality is even more rigid since exterior walls 2a cannot separate from the roof, under the effect of heat, since they are then retained by flange 19 of the roof 17, via ribs 66 of the ring. This configuration permits, in addition, to maintain constant the peripheral play around the roof.

Advantageously, according to one of the modes of constructions of the invention, the housing is formed by molding, said molding integrating at the lower part the technical base plate supporting the heating chamber and the electronic circuit.

This housing is thus inverted with respect to a conventional toaster where the housing comprises an upper edge and for which the molding develops a peripheral shell which is then assembled to a base plate in order to constitute said toaster housing.

What is claimed is:

1. A structure for stiffening a housing (2) of a toaster (1), said housing (2) being open at its upper part and being defined by one or several vertical walls (2a) resting on a base plate (2b), characterized in that said structure comprises a ring (30, 60) or ring portion capable of being mechanically linked with the upper parts of the walls (2a) of the housing (2).

2. The structure according to claim 1, characterized in that said ring or ring portion is peripheral along the circumference of the housing (2) and in that said ring or ring portion is situated at the top of said housing (2).

3. The structure according to claim 1, characterized in that said ring or ring portion is made of a material having low thermal conductivity.

4. The structure according to claim 1, characterized in that said ring or ring portion is made of a heat resistant material.

5. The structure according to claim 1, characterized in that said ring or ring portion has a transverse cross section at least partially U-shaped to cooperate with the upper edge of the housing.

6. The structure according to claim 1, characterized in that said ring or ring portion has means (31) for attachment to the walls (2a) of the housing (2) of the toaster (1).

7. A toaster (1) having a frame (3) arranged in a housing (2), at least one vertical toasting chamber (5) open at the upper part of the housing (2), a peripheral roof (17) at the opening of the toasting chamber (5), located essentially in the spaced defined by the housing and having an upper edge (18) provided with openings (20), heating means (4) situated in proximity to the toasting chamber (5), characterized in that the toaster has a means for stiffening the walls of the housing according to claim 1.

8. Toaster according to claim 7, characterized in that the ring (30, 60) or ring portion has a support zone (64) for the roof (17) of the toaster (1).

9. Toaster according to claim 7, characterized in that the ring (30, 60) or ring portion has one or several ribs (35, 65, 66), having a function of centering the roof (17).

10. Toaster according to claim 9, characterized in that certain of these ribs are situated in a facing relation on a substantially horizontal internal edge of the ring (30, 60), in such a manner as to provide a space for receiving the roof (17) between them.

11. Toaster (1) according to claim 7, characterized in that the toasting chamber (5) is delimited by two substantially vertical gripping grids (14) capable of moving toward one another when the heating elements (4) are supplied with power, said gripping grids (14) having an upper edge (15) that is substantially perpendicular to said grids and oriented toward the exterior of the chamber (5), in a manner to partially close the heating chamber, when they have moved towards one another, to thus divert the ascending hot air flow generated by the heating elements (4).

12. Toaster according to claim 7, characterized in that reflectors (6) are associated with the heating elements (4), said reflectors having, toward their upper end, a narrowing (22) by the intermediary of two converging slopes (23, 24).

13. Toaster (1) having a frame (3) arranged in a housing (2) that is open at its upper part in being defined by one or several vertical walls (2a) resting on a base plate (2b), at least one vertical toasting chamber (5) open at the upper part of the housing (2), a roof (17) peripheral to the opening of the toasting chamber (5), heating means (4) situated in proximity to the toasting chamber (5), said housing (2) being made of a plastic material, characterized in that the walls (2a) of the housing (2) do not have an edge at the upper part and are molded with the base plate (2b) of the housing.

14. Toaster (1) having a frame (3) arranged in a housing (2) that is open at its upper part in being defined by one or several vertical walls (2a) resting on a base plate (2b), at least one vertical toasting chamber (5) open at the upper part of the housing (2), a roof (17) peripheral to the opening of the toasting chamber (5), heating means (4) situated in proximity to the toasting chamber (5), said housing (2) being made of a plastic material, characterized in that the walls (2a) of the housing (2) do not have an edge at the upper part and are molded with the base plate (2b) of the housing, and further characterized in that said toaster has a means for stiffening the walls (2a) of the housing (2) according to claim 1.

* * * * *